United States Patent [19]

Troost

[11] Patent Number: 4,467,471
[45] Date of Patent: Aug. 21, 1984

[54] CIRCUIT ARRANGEMENT FOR TIME-DIVISION MULTIPLEX TELECOMMUNICATION SWITCHING SYSTEMS FOR MULTI-CHANNEL CONNECTIONS

[75] Inventor: Marcel A. Troost, Munich, Fed. Rep. of Germany

[73] Assignee: Siemens Aktiengesellschaft, Berlin & Munich, Fed. Rep. of Germany

[21] Appl. No.: 326,705

[22] Filed: Dec. 2, 1981

[30] Foreign Application Priority Data

Dec. 3, 1980 [DE] Fed. Rep. of Germany ........ 3045606

[51] Int. Cl.³ .......................................... H04Q 11/04
[52] U.S. Cl. ....................................... 370/68; 370/66
[58] Field of Search ............................. 370/68, 66, 58

[56] References Cited

U.S. PATENT DOCUMENTS

3,573,381  4/1971  Marcus .................................. 370/68
4,320,501  3/1982  LeDieu et al. ........................ 370/68

FOREIGN PATENT DOCUMENTS

25225    3/1981  European Pat. Off. .............. 370/68
1417300 12/1975  United Kingdom .

OTHER PUBLICATIONS

Geissler, H., "Contribution to Planning Pulse Code Modulation Systems . . . ", NTZ, No. 11, pp. 667-682.
Hessenmüller, H., Digital Sound Transmission", The Telecommunications Engineer, vol. 32, No. 11, pp. 1-36.
Kersten, R., "Pulse Code Modulation", Siemens Review XXXVIII, (1971), Special Issue Communications Engineering, pp. 186-194.

*Primary Examiner*—Douglas W. Olms
*Attorney, Agent, or Firm*—Hill, Van Santen, Steadman & Simpson

[57] ABSTRACT

Due to a control engineering context, write and read pulse frames of time-slot multiplexers of different switching matrix stages in a multi-stage, time-division multiplex switching matrix network exhibit coinciding pulse frame boundaries. In deviation therefrom, pulse frame boundaries of the pulse frames on switching network internal time-division multiplex lines are offset due to delays that are caused by serial-to-parallel and parallel-to-serial conversions of a partial information upon their intermediate storage in the time-slot multiplexer. Of two complete memories per time-slot multiplexer, one part of the one memory and another part of the other memory are inscribed during the pulse frame of an incoming time-division multiplex line. Auxiliary information is derived from an address (corresponding to the outgoing time channel) serving for the selection of a holding memory and form an address (corresponding to the incoming time channel) assigned for reasons of switching engineering and serving for the selection of a complete memory, the auxiliary information indicating from which of the complete memories the information to be forwarded is to be read so that, given multi-channel connection, the required sequence of the partial information is assured.

9 Claims, 1 Drawing Figure

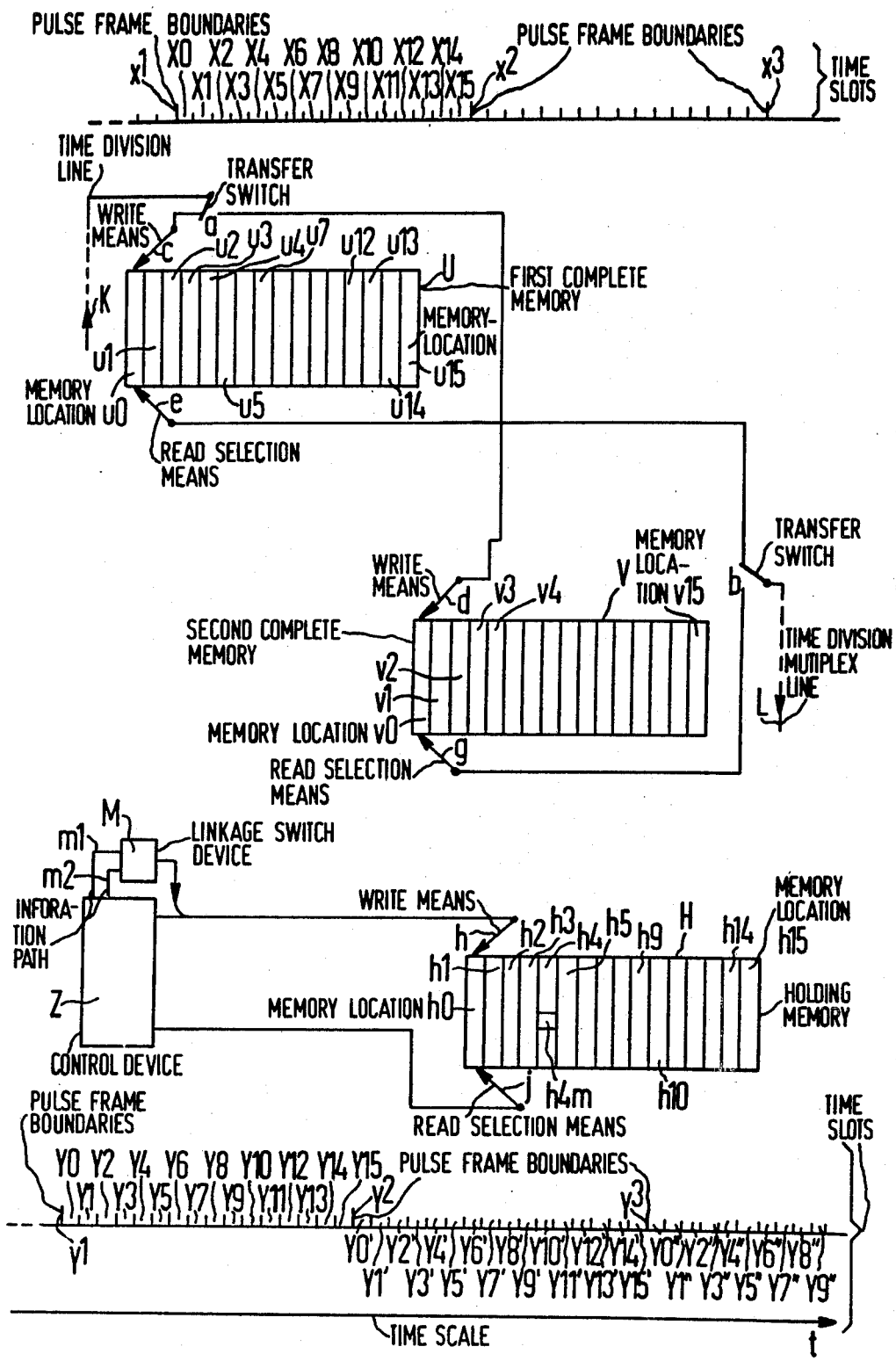

CIRCUIT ARRANGEMENT FOR TIME-DIVISION MULTIPLEX TELECOMMUNICATION SWITCHING SYSTEMS FOR MULTI-CHANNEL CONNECTIONS

BACKGROUND OF THE INVENTION

1. Field of the Invention

The present invention relates to telephone systems, and particularly to circuit arrangements for time-division multiplex telecommunication switching systems, particularly for pulse code modulation (PCM) telephone switching systems. More particularly, the invention relates to such systems having a time-division multiplex switching network by way of which, in comparison to a connection (single channel connections) loading only a respective single time channel, connections loading two or more time channels (multi-channel connections) can be produced for the purpose of attaining greater bandwidth and/or a finer amplification gradation, and in which, given the switching of time channels of an incoming time-division multiplex line belonging to a multi-channel connection to corresponding time channels of an outgoing time-division multiplex line by means of a full memory suitable for the acceptance of the partial information maximally transmittable in pulse frame, the original chronological sequence of the partial information incoming per pulse frame via the time channels is retained upon their transmission, and in which the write operation serves for an acceptance of the incoming partial information at memory locations of the full memory only per incoming time channel is cyclically executed and the read operation which serves for a relaying of the partial information only via the outgoing time channels is executed according to switching data which indicate the allocation of the outgoing time channels to the incoming time channels and are stored per outgoing time channel at memory locations of a holding memory in the form of memory location addresses of the full memory.

2. Description of the Prior Art

A circuit arrangement of the type generally set forth above is already known from the German allowed and published application 2,246,534 which corresponds to the British patent specification No. 1,417,300. The interrelationships and details of the reasons for a production of multi-channel connections are likewise known in the art. The circuit arrangement disclosed in the aforementioned application and patent, because of the employment of a full memory in the completion of not only single-channel connections, but of multi-channel connections as well, makes relatively complicated and, therefore, work-intensive counting, linkage and selection operations necessary for the exchange-oriented assignment of free outgoing time channels to incoming busy time channels of a multi-channel connection to be completed.

Furthermore, the known arrangement proceeds from the fact that the pulse frame boundaries of the write pulse frames, read pulse frames and the pulse frames of the incoming and the outgoing time-division multiplex lines chronologically coincide. Given a multi-stage switching matrix network having a plurality of time slot multiple switching matrix stages, the partial information transmitted via the time channels nonetheless experience a delay which is caused by the write operations and read operations and the serial-to-parallel conversions and parallel-to-serial conversions which occur, the delay adding up from switching matrix stage (time slot multiple)-to-switching matrix stage.

Therefore, it has been provided in known time-division multiplex switching matrix networks to differently drive the time slot multiples of the various switching matrix stages in such a manner that the right pulse frames and read pulse frames are not coincident from coupling matrix stage-to-coupling matrix stage with respect to the pulse frame boundaries but, rather, that the pulse frame boundaries are mutually offset so that the write pulse and read pulse boundaries are chronologically matched to the pulse frame boundaries of the pulse frame of the time-division multiplex lines. As proceeds from the above explanations, the pulse frames of the time-division multiplex lines, of course, which extend between the various switching matrix stages, are not chronologically coincident with respect to the pulse frame boundaries, depending upon the two switching matrix stages between which they respectively extend. In that the time multiples of the different switching matrix stages in known time-division multiplex switching systems are controlled in such a manner that the pulse frames are respectively chronologically matched with respect to the pulse frame boundaries to the pulse frame boundaries of the pulse frames of the incoming time-division multiplex lines, sequence problems for the successive partial information of a multi-channel connection are avoided in this case which is well known in the art. However, a control condition by the chronological matching which is not isochronic with respect to the pulse frame boundaries for all time slot multiple switching matrix stages results in the fact that the control operations become more involved, particularly in view of the work expense and in view of the switching means serving the control.

SUMMARY OF THE INVENTION

The object of the present invention, therefore, is to simplify the control operations of the time slot multiples as far as possible in a multi-stage time-division switching matrix network by standardization and to resolve the sequence problems existing given multi-channel connections in a manner which is similar in terms of control engineering and exchange engineering in comparison to that which is known in the art.

The above object is achieved, according to the present invention, in that, in a manner known per se, a second full memory is provided; in that the one full memory is in a writing operation during the duration of a first write pulse frame and the other full memory is in a writing operation during the duration of a succeeding, second write pulse frame. The pulse frames of the time channels of an incoming time-division multiplex line are chronologically offset with respect to the write pulse frame, in a lagging sense, by a whole multiple of the duration of a time slot corresponding to a time channel, whereby, in accordance with this time offset, the partial information incoming during a pulse frame are partially stored in a second row of last memory locations of the one full memory and a partially stored in a first row of first memory locations of the other full memory. The partial information stored in the memory locations of both full memories are read within the succeeding pulse frame of the incoming time-division multiplex line in order to be brought to transmission via outgoing time channels. Logical linkage switches are provided with whose assistance it can be derived from a full memory location address to be stored or stored for each of the outgoing time channels under the holding memory location addresses corresponding thereto in conjunction with the appertaining holding memory location address, as to in which of the two full memories the partial information stored under this full memory location address is to be read.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE of a schematic representation of the structure of the invention.

DESCRIPTION OF THE PREFERRED EMBODIMENTS

Referring to the drawing, among other things, the arrangement illustrated shows two full memories U and V, a holding memory H and a control device Z of a time slot multiple, as well as an incoming time-division multiplex line K and an outgoing time-division multiplex line L. A time scale t is shown in the lowest portion of the drawing. Two pulse frames are indicated immediately thereabove which relate to the transmission of partial information via the time-division multiplex line L whose pulse frame boundaries are referenced with y1, y2 and y3 and which comprise the time slots Y0–Y15 and Y0'–Y15' as well as Y0''–Y9'', i.e. time intervals in which 16 partial information can be individually transmitted per pulse frame, for example, y1–y2, via 16 outgoing time channels—i.e. therefore, the time channels of the time-division multiplex line L. A pulse frame is likewise indicated in the uppermost part of the drawing, this pulse frame relating to the reception of partial information via the time-division multiplex line K whose pulse frame boundaries are referenced with x1 and x2 and which comprises the time slots X0–X15, i.e. time intervals in which 16 partial information can be individually transmitted via 16 time channels—i.e., therefore, the time channels of the time-division multiplex line K.

The described arrangement is provided for an application in time-division multiplex telecommunication switching systems. These can serve telephone engineering and telex engineering purposes, but can also serve purposes of any other type of data transmission and purposes of any other type whatsoever. Given the time-division multiplex technology employed, it can be a matter of any of its particular types, such as, for example, with pulse amplitude modulation or with pulse code modulation. Time-division multiplex telecommunication switch systems respectively exhibit a time-division multiplex switching matrix network which is usually constructed as a multi-stage network. Similar to the case given, pure space switching multiple switching arrangements of a conventional type (for example, relay switching matrices constructed of bistable, polarized switching relays), which can usually exhibit a plurality of switching matrix stages, for example, two, three, four, five or six switching matrix stages, time-division multiplex switching matrix networks are also constructed in a multi-stage manner, whereby either time-slot multiplexers, space-slot multiplexers or space-time-slot multiplexers can be provided in each of the stages. To provide multiplexers of more than one of these types in the stages is thereby not excluded.

As is known in the art, a time channel by way of which a connection is being through-connected permits this connection a specific bandwidth and a specific amplitude gradation. These derive from the sampling frequency and from the plurality of bits per partial information which are obtained per sampling operation. In this context, one may refer to the publication Nachrichtentechnische Zeitschrift 1967, No. 11, pp. 667 et seq. and to the publication Siemens Zeitschrift 45 (1971), supplement "Nachrichten-Übertragugnstechnik", pp. 186–194, and to the periodical "Der Fernmelde Ingenieur", Vol. 32, No. 11. In comparison to single-channel connections of the type previously addressed, there are multi-channel connections which pleated for the purpose of achieving a greater bandwidth and/or a finer amplitude gradation and respectively comprise a plurality of individual channels through-connected in parallel. For example, multi-channel connections can be required for the transmission of radio programs, video programs, for data transmission, for video-telephone connections and the like. As shall be explained in greater detail below, the illustrated and described arrangement for a time-division multiplex telecommunication switching system serves for the completion of multi-channel connections as well as single-channel connections. As already disclosed in the aforementioned German allowed and published application 2,246,534, just as in this known case, the original chronological sequence of the partial information incoming per pulse frame via the time channels is retained when they are transmitted, this occurring during the switching of the time channels of an incoming time-division multiplex line belonging to a multi-channel connection to corresponding time channels of an outgoing time-division multiplex line by means of a full memory suited for the acceptance of the maximally-transmittable partial information in a pulse frame. In contrast to the known case, however, two full memories U and V are employed in the case of the present invention instead of a single full memory.

The time scale t as well as the pulse frames with the pulse frame boundary x1 and x2 and y1, y2 and y3 illustrated on the drawing were mentioned above. The 16 partial information incoming in the 16 time slots X0–X15 via the time channels of the incoming time-division multiplex line K are individually inscribed, i.e. stored, at the memory locations u0–u15 and v0–v15 of the two full memories U and V. The writing operation is cyclically sequenced. Therefore, each of the partial information is respectively inscribed in a memory location. In the sequence of their arrival, these partial information are successively inscribed according to the sequence of their time slots at the memory locations u0, u1, u2, u3, ..., u15 and v0, v1, v2 ... v15, u0, u1, etc. To this end, a selection write means c or, respectively d, is provided in a known manner per full memory. A common selection write device can also be provided for both full memories. The selection write device c, therefore, is successively advanced. The advancing operations also occur successively after the duration of a time slot corresponding to a time channel. Each of the time slots of the partial information always corresponds to a specific position of the selection write means c. The same applies to a selection write means d of the full memory V.

The two full memories are alternately in the write mode. While the one full memory is in the write mode, its selection write means is advanced successively in the manner indicated; during this time, the selection write means of the other full memory can be in an idle position. However, it would also not be disruptive if both selection write means were always simultaneously and synchronously successively advanced and it is simply accomplished with the assistance of a transfer switch a that is only one of the two selection write means is always effective.

Which of the two full memories is respectively in the write mode and which is not in that mode is indicated by the momentary position of the transfer switch a illustrated as a relay contact but, which, preferably, is realized in a known manner with electronically operating means. Therefore, the transfer switch a always remains in its respective switch position during the duration of an entire writing cycle of one of the full memories and always changes to its other position after the conclusion of such a writing cycle and before the beginning of the writing cycle of the respective other full memory. The transfer switch a is illustrated in the drawing in such a manner that, in accordance with the illustrated switch position, the full memory U is currently in the write mode and its write cycle has just begun (the selection write means c has just been set to the memory location u0). When the two memories U and V are equipped with a common selection write means, then the same successively reaches the memory location u0–u15 and v0–v15 of both memories u and v. In this case, the momentary switch position of the common selection write means would obviously indicate which of the two memories is respectively in the write mode and which is not.

A write cycle of one of the memories extends over the duration of as many successive time slots as partial information could arrive during the time of a pulse frame. The duration of a write cycle of always one of the memories corresponds to a pulse frame. Therefore, the term "write pulse frame" is assigned to the term "write cycle". Such a cycle always sequences within such a frame. Accordingly, one of the two memories is always in the write mode during the time of a first write pulse frame and the other is in the write mode during the time of a succeeding, second write pulse frame, then the first memory again, etc.

As can be further derived from the drawing, the pulse frames of the time channels of the incoming time-division multiplex line K are chronologically offset with respect to the write pulse frames in a lagging direction by a whole multiple of the duration of a time slot corresponding to a time channel. In the present example, this offset amounts to three times the duration of a time slot corresponding to a time channel. For example, the selection write means c is already set to the memory location u3 in the time slot x0. When it has reached a memory location u4, then the partial information with the time slot x1 is just arriving by way of the time-division multiplex line K. This offset in the sense of a lag of the pulse frames of the time channels of the incoming time-division multiplex line K in comparison to the write pulse frames of the memories U and V, therefore, amounts to three times the duration of a time slot corresponding to a time channel. By so doing, and in accordance with this offset, the partial information arriving during the pulse frame are partially stored in a second row of last memory locations u3–u15 of the full memory U and are partially stored in a first row of first memory locations v1–v3 of the other memory V.

The previously-indicated chronological relations between the pulse frames of the partial information incoming via the time channels of the incoming time-division multiplex line, on the one hand, and the write pulse frames of the memories, on the other hand, are expressed on the drawing in that, except for the pulse frames of the incoming time-division multiplex line K and of the outgoing time-division multiplex line L, the common time scale t also applies to the memories U and V and to their memory locations, as well as to the switch positions of the two selection write means. Which of the time slots X0–X15, Y0–Y15, Y0'–Y15' and Y0''–Y9'' is respectively being reached in the operating sequence and which of the switch positions of the selection write means c and d assume given the respectively given time slot is thus derived from the time scale t. The analogous case applies to the selection read means e and g of the two full memories and to a selection write means h and a selection read means j of a holding memory H. However, this shall be discussed in greater detail below.

The aforementioned holding memory H serves for the storage of switching data which indicate the allocation of outgoing time channels to incoming time channels within the described time slot multiplexer. This allocation corresponds to the through-connection data for a respective connection in a space switching multiplexer of conventional type (input coordinate line number/output coordinate line number).

As is known, these switching data are respectively determined for a connection by means of information-processing linkage operations with the assistance of a route-finding means on the basis of data stored in a seizure memory (in systems having an older format; route-searching network) concerning the state (free or busy) of all applicable portions of the switching network, primarily of the intermediate lines. These switching data clearly indicate the course of a connection which is to be through-connected and is through-connected via the multi-stage switching network concerning the intermediate lines and matrix switching points or, respectively, time-division multiplex lines, time channels, time slots, etc, which are thereby utilized. In the present case, such route-searching operations also occur for each connection to be through-connected. If it is thereby a matter of a multi-channel connection instead of a single-channel connection, then a plurality of such route-searching operations can be individually carried out for the plurality of connection completion operations which is required.

As indicated, the switching data determined by means of route-searching operations—insofar as they relate to a connection extending over the appertaining time slot multiplexer—are stored in the holding memory of the time slot multiplexer. The memory locations of the holding memory are permanently assigned to a channel numbers of the outgoing time channels. As has already been set forth above, the connection, related partial information arriving via the incoming time channels per pulse frame are cyclically written into the memory. In contrast thereto, the read mode, which serves for individually forwarding these partial information via the outgoing time channels, occurs according to the switching data which indicate the allocation of the outgoing time channels to the incoming time channels and are stored per outgoing time channel at memory locations of the holding memory in the form of memory location addresses of the complete memory. Per outgoing time channel, and at a memory location respectively permanently assigned to that time channel, therefore, it is indicated in the holding memory under which complete memory location address the partial information to be forwarded via this time channel is inscribed, i.e. is intermediately stored.

As mentioned above, the memory locations of the holding memory are permanently assigned to the time channels of an outgoing time-division multiplex line. For the purpose of forwarding the intermediately-stored partial information from the complete memory, accordingly, the memory locations of the holding memory are cyclically selected in accordance with the time slots of the outgoing time channels. The fixed assignment can be undertaken in such a manner that the pulse frames of the time channels of an outgoing time-division multiplex line are coincident with the read cycle of the holding memory, i.e. that the pulse frame boundaries chronologically coincide with the transfer of the read operations in the holding memory from the time slot y15 to the time slot y0 or, respectively, from the time slot y15' to the time slot y0'. However, this is not illustrated on the drawing. On the contrary, it is assumed in the example that the pulse frame boundaries of the pulse frames of the outgoing time channels are not chronologically coincident in comparison to the beginning and to the end of the write cycles of the complete memories but, rather, have a delay of a whole number multiple of the duration of a time slot corresponding to a time channel. Therefore, this is similar to the chronological offset between the pulse frames of the time channels of an incoming time-division multiplex line, on the one hand, in comparison to the write pulse frames of the complete memories, on the other hand, which has already been discussed in detail above.

The mentioned offset and the delay proceed from the conditions in the time-division multiplex line (incoming or, respectively, outgoing). The time slot multiplexers in the various exchange switching stages are isochronically driven with respect to the pulse frame boundaries of the write pulse frames and of the read pulse frames of the complete memories of the time slot multiplexers. The pulse frame boundaries of the pulse frames belonging to time-division multiplex lines in the isochronic control, as previously indicated, cannot remain coincident with the pulse frame boundaries of the write pulse frames and of the read pulse frames. As already indicated above, the partial information of an entire pulse frame are necessarily subject to delays, for example, by the respective time span of a time slot corresponding to a time channel, during the write operations and during the read operations due to the serial-to-parallel conversions and parallel-to-serial conversions which thereby occur. Therefore, the entire pulse frame is thereby respectively delayed and its two pulse frame boundaries experience the chronological offset in the manner set forth above.

As also mentioned above, the switching data are written into the holding memory H. This is accomplished with the assistance of the control device Z. In a manner not described in detail herein, it receives the switching data or the connection now being completed. These switching data respectively indicate the assignment between an outgoing time channel and an incoming time channel in a time slot multiplexer for a connection. A very specific memory location in the holding memory H corresponds to the outgoing time channel. A very specific memory location in each of the two complete memories corresponds to the incoming time channel. With the assistance of data corresponding to the outgoing time channel, the control device Z controls the selection write means h to the appertaining holding memory location and subsequently effects the inscription therein of the complete memory location address corresponding to the appertaining incoming time channel.

In conjunction therewith that the partial information belonging to a multi-channel connection and arriving in the various time slots within a pulse frame of the incoming time-division multiplex line, via that line, in a specific sequence, must again be relayed, after intermediate storage in the complete memories, in the same sequence, it is provided that the partial information stored in the memory locations of both complete memories are read out precisely within the next-successive pulse frame of the incoming time-division multiplex line in order to be forwarded for transmission via outgoing time channels. The partial information arriving within the pulse frame defined by the pulse frame boundaries x1 and x2 via the time channels of the time-division multiplex line K in the time slots X0–X15, the partial information being stored at the memory locations u3–u15 (time slots x0–x12) of the complete memory U and (after actuation of the transfer switch a after the time slot X12) at the memory locations v0–v2 (time slots X13–X15) of the complete memory V in accordance with the illustration on the drawing (which, as described, also indicates the relations between time slots of the time channels, on the one hand, and memory locations of the complete memory and of the holding memory, on the other hand), are therefore transmitted during a pulse frame whose beginning is characterized by the pulse frame boundary x2 and within which the first time slot at the transmission side is referenced Y7'.

As has already been explained, the inscription of the partial information arriving by way of the time-division multiplex line K per time channel occurs cyclically. Therefore, they are successively inscribed at the memory locations of the complete memories U and V in succession in the sequence of their time slots. In contrast thereto, the reading of these partial information occurs cyclically with respect to the sequence of the memory locations of the complete memories U and V; it occurs according to the switching data stored in the holding memory H. The holding memory locations are individually assigned to the time channels of the outgoing time-division multiplex line L. Accordingly, the holding memory locations h0–h15 are successively selected in succession via the selection read means j and the complete memory location address is stored therein are individually read from each individual holding memory location. The holding memory location address plus complete memory location address stored in the appertaining holding memory represent the switching data relating thereto and to the respective time stage per respective connection.

When one of the holding memory locations is selected by the control device Z and the read selection means j controlled thereby, and when the complete memory location address stored therein is read out, then the control device controls one of the read selection switches e and g (or both!) with the same to the appertaining complete memory location. The partial information stored at that location can now be read and transmitted onto the outgoing time-division multiplex line L and in that time slot which is chronologically allocated to the previously-selected holding memory location. Regarding the reading of the partial information, the question must also be discussed, according to the context of the invention, concerning from which of the two complete memories the partial information to be transmitted under the full memory location address taken from the holding memory is now actually to be read. This alternative exists again at every outgoing time channel.

For the purpose of explaining this previously-addressed question, it should first be pointed out in very general terms that it can be derived from the full memory location address to be stored (or stored) in the holding memory for each of the outgoing time channels under the holding memory location addresses corresponding to the time channels at to in which of the two complete memories the partial information stored under the complete memory location address is to be read. The interrelationship of a holding memory location address with a complete memory location address stored at the appertaining holding memory location reproduces the switching data for the appertaining connection regarding the respective time slot multiplexer.

When the switching data concerning a time slot multiplexer have been determined in the course of a connection completion by means of a routing search and when they are transferred to the appertaining control device Z, then the control device not only undertakes the described storage (inscription) at the holding memory location corresponding to the respective outgoing time channel but, rather, with the assistance of a logical linkage switch device M to which the appertaining holding memory memory location address is supplied via the information path m1 and to which the appertaining complete memory location address is supplied via the information path m2, forms an auxiliary information which is stored at the appertaining holding memory location, together with the complete memory location address. Serving this purpose is a particular part of each holding memory location h4m which is illustrated at the holding memory location h4. This auxiliary information, therefore, respectively provides information concerning from which of the two complete memories a partial information to be respectively transmitted via an outgoing time channel is to be read when the appertaining complete memory location is selected with the assistance of the complete memory location address read from the holding memory. The content and the effects of this auxiliary information shall be subsequently explained.

As explained, the boundaries which are fixed by the pulse frame boundaries x1, x2, x3, etc, of the pulse frames of the incoming time channels are valid for the assignment of outgoing time channels to incoming time channels. Outgoing time channels can be allocated to the time slots x0–x15, i.e. to the time slots of the pulse frame, in terms of switching engineering in such a manner that the time slots x0–x15 of the incoming time channels have time slots of the outgoing time channels assigned thereto within the respectively succeeding pulse frame of the incoming time channels, for the transmission of the appertaining partial information, i.e. time channels, for example, with the time slots y7'–y6''.

To this end, it is further provided that, just as for each of the pulse frames (for example, x1/x2) of the incoming time channels (for example, with the time slots x0–x15) is subdivided by means of the offset of the right pulse frames (for example, leading by three time slots) prescribed in comparison thereto into a first partial frame (for example, x0–x12) of time channels with respect to time slots to which the second row of memory locations (for example, u3–u15) is assigned in the one complete memory (for example U) and into a following, second partial frame (for example, X13–X15) of time channels with respect to time slots to which the first row of memory locations (for example, v0–v2) is assigned in the other complete memory (for example, the complete memory V) the outgoing time channels which respectively lie within a next-successive pulse frame of the incoming time channels with their time slots (for example, y7'–y6'') are combined in a corresponding manner into a first partial frame (for example, Y7'–Y3'') with respect to time slots and into a following, second partial frame (Y4''–Y6'') with respect to time slots. It is further provided that, in the exchange-oriented assignment of outgoing time channels of the first partial frame or, respectively, the second partial frame (for example Y7'–Y3'' or, respectively, Y4''–Y6'') whose individual time slots correspond to the memory location addresses of the memory locations (for example, h0–h12 or, respectively, h13–h15) of the holding memory H to incoming time channels of the first partial frame or, respectively, the second partial frame (for example, X0–X12 or, respectively, X13–X15) whose individual time slots correspond to the memory location addresses of the two complete memories U and V stored in the memory locations (for example, h0–h12 or, respectively, h13–h15) of the holding memory H, a partial information to be transmitted on an outgoing time channel in its time slot (for example, Y10' given assignment to X4 or, respectively, Y5'' given assignment to X14) can, with the assistance of the complete memory location address stored in the holding memory H, be respectively read out of that complete memory which is not in the write mode at that time, in contrast whereto, in an exchange-oriented allocation of outgoing time channels of the first partial frame or, respectively, the second partial frame (for example, Y7'–Y3'' or respectively, Y4''–Y6'') to incoming time channels of the second partial frame or, respectively, first partial frame (for example, X13–X15 or, respectively, X0–X12), a partial information to be transmitted on an outgoing time channel in its time slot (for example, Y4'' given allocation to X11 or, respectively, Y9' given allocation to X15) can be respectively read from that complete memory (for example, the memory U) which is in the write mode at that time. Due to these measures, it is assured that the plurality of partial informations arriving within an incoming pulse frame in a specific sequence and belonging with this sequence to a multi-channel connection is always forwarded by way of outgoing time channels in the same sequence, i.e. in an unchanged sequence.

In the foregoing, an extremely basic explanation of an exemplary embodiment of the invention and its manner of operation, operating instances which need not occur at the same time have been cited, so to speak, in one and the same breath. In a routing search and path selection preceding every connection completion, outgoing time channels of the first partial frame (Y7'–Y3'') are first always assigned to incoming time channels of the first partial frame (X0–X12). Further, depending on the unoccupied state of outgoing time channels and depending on the occupation of incoming time channels by a multi-channel connection in the process of completion, either outgoing time channels of the first partial frame (Y7'–Y3'') are assigned to incoming time channels of the second partial frame (X13–X15) or outgoing time channels of the second partial frame (Y4″–Y6″) are assigned to incoming time channels of the first partial frame (X0–X12). Finally, likewise depending on the unoccupied state of outgoing time channels and on the occupation of incoming time channels by a multi-channel connection in the process of being completed, outgoing time channels of the second partial frame (Y4″–Y6″) are also assigned to incoming time channels of the second partial frame (X13–X15).

The above, exemplary embodiment of a multi-channel connection which has been kept in very general terms, is now to be augmented by a more detailed description. To this end, it will be assumed that the outgoing time channels with the time slots Y10′, Y4″ and Y5″ are assigned in this sequence in terms of switching engineering to incoming time channels with the time slots X4, X11 and X14. This assignment occurs on the basis of the results of a preceding routing search. As a further assignment, it should also be assumed that, moreover, the incoming time channel with the time slot X0 is also assigned in terms of switching technology to the outgoing time channel with the time slot Y8′.

Given this example, let a partial information arriving in the time slot X0 be inscribed at a memory location u3. This can be seen on the drawing. This partial information is to be retransmitted in the time slot Y8′. The complete memory U is not in the write mode in the time slot Y8′. As a consequence, when the switching data indicating the exchange-oriented assignment between the time channels with the time slots X0 and Y8′ is written in the memory locations h1 which is permanently assigned to the transmission time slot Y8′, a "0" is inscribed as auxiliary information at the appertaining memory location portion (h4m) which indicates that the partial information to be transmitted in the time slot Y8′ in accordance with the switching data stored in the holding memory H and the appertaining complete memory location address is to be read from the complete memory U (thus, not from the complete memory V which is in the write mode at this time). This exchange-oriented assignment between the time channels 0 and Y8′ results in the fact that the respective partial information to be intermediately stored must always be intermediately stored in the complete memories for a time span which is greater than that of the pulse frame. In this connection, it proves necessary that two complete memories be provided; for, a partial information arriving in the time slot X0 (or, respectively, X0′, X0″, etc), as can be seen on the drawing, always arrives somewhat earlier than the time of the retransmission of the intermediately stored partial information of the preceding pulse frame which arrived in the same time slot.

Given the exemplary connection so far described, let a partial information arriving in the time slot X4 be inscribed at the memory location u7. This again follows from the drawing. In accordance with the exchange-oriented assignment, this partial information is to be retransmitted in the time slot Y10′. The complete memory U is not in the write mode in the time slot Y10′. As a consequence, upon inscription of the switching data indicating the exchange-oriented assignment between the time channels with the time slots X4 and Y10′ at the memory location h3 which corresponds to the transmission time slot Y10′, a "0" is likewise inscribed as an auxiliary information which means that the partial information to be forwarded for transmission in the time slot Y10′ in accordance with the switching data stored in the holding memory is to be read with the appertaining complete memory address from the complete memory U.

If one now compares the exchange-oriented assignment of the time channels with the time slots X0 and Y8′, on the one hand, and with the time slots X4 and Y10′, on the other hand, then one can see that this latter assignment (X4 and Y10′) provides an intermediate storage of the appertaining partial information which has a duration shorter than that of a pulse frame and that, in view of such an assignment, a retransmission of the partial information can only occur during a pulse frame which is next-successive in comparison to the respective reception pulse frame (as was explained above, the retransmission of a partial information which arrived during the reception pulse frame always occurs during a transmission time slot which lies within the pulse frame boundaries of the pulse frame which is the next following the respective reception pulse frame). For it is only within this next-successive pulse frame that the appertaining partial information exists intermediately stored in the appertaining complete memory at the corresponding transmission time slot.

Summarizing up to now, therefore, it should be pointed out that, given an exchange-oriented assignment of outgoing time channels with the time slots Y7′–Y3″ individually to incoming time channels with the time slots X0–X12, a partial information to be read to the respective transmission time slot is to be respectively read from that complete memory which is not in the write mode at that time. The same also applies given an exchange-oriented assignment of outgoing time channels with the time slots Y4″–Y6″ individually to incoming channels with the time slots X13–X15.

In addition, however, an outgoing time channels with time slots Y7′–Y3″ of the aforementioned first partial frame of outgoing time channels can also be individually assigned in terms of switching technique to incoming time channels with the time slots X13–X15 of the aforementioned second partial frame of incoming time channels. Therefore, for example, it was previously indicated that the outgoing time channel with the time slot Y4″ is assigned in terms of switching engineering to the incoming time channel with the time slot X11. The appertaining partial information, as the overall context of the described exemplary connection shows, is inscribed at the memory location u14 of the complete memory U. The complete memory U is in the write mode at the time slot Y4″. Because of the exchange-oriented assignment of the time channels with the time slots Y4″ and X11, therefore, it is necessary that the partial information to be retransmitted in the transmission time slot Y4″ be read from that complete memory which is in the write mode at that time. Upon inscription of the appertaining switching information at the memory location h13 of the holding memory H, therefore, a "1" is inscribed as auxiliary information which, during the transmission operation, effects that the appertaining partial information is taken from that complete memory which is in the write mode at that time. As was already explained, the criterion as to which of the two complete memories is respectively in the write mode and which is not, is provided by the momentary position of the transfer switch a.

In addition, according to the above exemplary connection for a four-channel connection, it is provided that the time channels with the time slots Y5″ and X14 are assigned to one another. The partial information arriving at the reception time slot X14 is inscribed in the complete memory V at the memory location v1. The partial information is to be retransmitted at the transmission time slot Y5''. The complete memory V is in the write mode at this time and the complete memory U is not in the write mode. Consequently, the partial information to be transmitted at the transmission time slot Y5'' is to be taken from that complete memory which is not in the write mode at that time. Therefore, in addition to the appertaining switching information, a "0" is written as the auxiliary information at the memory location h14 in the holding memory H, on the basis of which "0" the partial information necessary for the retransmission of the partial information at the transmission time slot Y5'' is read out at the time of the transmission from the complete memory which is in the write mode at the time.

The manner in which this auxiliary information is obtained has already been mentioned. It is respectively derived from the appertaining holding memory location address and the appertaining complete memory location address and is likewise stored in the holding memory, in particular, at the same holding memory location as the appertaining complete memory location address and is again read together with the appertaining complete memory location address. Chronologically, this occurs before or simultaneously with the inscription of the complete memory location address into the holding memory. The necessary linkage occurs with the linkage device M.

It is likewise already been indicated that the same respective complete memory location address serves for the selection of each of the memory locations in the two complete memories U and V. In addition to the appertaining complete memory location address, the stored auxiliary information in accordance with which the partial information to be transmitted via the outgoing time channel corresponding to the holding memory location address is to be read from the complete memory presently encountered in the write mode, or from the complete memory presently not encountered in the write mode, serves for selecting a memory location in the one complete memory or the other complete memory. Deviating from what was described above, it is also possible that the auxiliary information is derived in the described manner only after the reading of the appertaining complete memory location address from the holding memory.

It is, moreover, provided that both multi-channel connections as well as single-channel connections can be through-connected via the television multiplex switching matrix network which was previously described in part on the basis of the drawing. In the completion of single-channel connections, the assignment of outgoing time channels to incoming time channels, as well as the writing and reading of memory location addresses and of partial information, is sequenced in the same manner as in the completion of multi-channel connections. Deviating therefrom, however, there is also the possibility, given a completion of both multi-channel connections and single-channel connections, to sequence a completion of single-channel connections differently than a completion of multi-channel connections. However, the two complete memories are also employed in this case for single-channel connections. In a manner similar to linkage switch device M for multi-channel connections, a further linkage switch device (not illustrated in detail) is provided with whose assistance it can be derived for each of the time channels of the outgoing time-division multiplex line concerning in which of the two complete memories (U or V) the partial information is stored under the respective complete memory location address is to be read, being derived from the holding memory location address respectively assigned to the appertaining time channel and from the complete memory location address to be stored or stored at the appertaining memory location in the holding memory. This, therefore, is similar to the case given multi-channel connections. The mentioned linkage switch device can be designed similar to the linkage switch device M. It is generally provided that the complete memory location addresses and the holding memory location addresses correspond to time values which reproduce the time slots of the incoming time channels and of the outgoing time channels and that a partial information to be read from one of the complete memories for a connection completed between an incoming time channel and an outgoing time channel is to be read from the complete memory respectively encountered in the write mode—or, respectively, not encountered in the write mode—when the time value corresponding to the appertaining complete memory location address is smaller—or, respectively, larger— than the time value corresponding to the appertaining holding memory location address. Details relating thereto are set forth below.

The full memory location addresses correspond to time values in accordance with the time scale t. Therefore, for example, a partial information arriving in the time slot X1 necessarily arrives at the complete memory U and is inscribed at the memory location u4. To this degree, therefore, a complete memory location addresses correspond to time values. However, it likewise proceeds from the drawing that the holding memory location addresses correspond to time values, for the holding memory locations are cyclically selected in succession by the control device Z with the assistance of the read selection switch h. According to the drawing, this occurs at the time slots Y7'–Y6''.

For the purpose of simplifying the technical interrelationships, it should be pointed out here, deviating from what was described above, that the read cycle of the holding memory H begins with the time slot Y4' and is terminated with the time slot Y3''. In such an instance, therefore, the write pulse frame of the complete memory U or, respectively, V (alternating) chronologically coincides with the read pulse frame of the holding memory H. The aforementioned time values respectively indicate the distance of a time slot within the pulse frame from the pulse frame boundary at the beginning of the appertaining pulse frame. Given this assumption, there has been the rule that a partial information to be read from one of the complete memories for a connection completed between an incoming time channel and an outgoing time channel is to be read from that respective complete memory which is in the write mode when the time value corresponding to the appertaining complete memory location address is smaller than the time value corresponding to the appertaining holding memory location address with respect to the switching data for a completed single-channel connection. Further, a partial information to be read from one of the complete memories for a connection completed between an incoming time channel and an outgoing time channel is to be read from that respective complete memory not in the write mode when the time value corresponding to the appertaining complete memory location address is greater than the time value corresponding to the appertaining holding memory location address.

Now, the discussion will return to the chronological relations between the reception pulse frame, the transmission pulse frame, the write pulse frame and the read pulse frame described above and in accordance with the drawing. According to this, among other things, the pulse frame boundaries y1, y2, y3 etc, of the pulse frames of the outgoing time channels are not chronologically coincident with respect to the beginning and to the end of the write complete memories, for example, between the time slots X12 and X13 but, rather, have an offset by a whole multiple of the duration of the time slot corresponding to a time channel. This offset amounts to 12 time slots. In the present instance, the aforementioned multiple is twelve-fold. In the time comparison, therefore, the pulse frame boundary y2 lies between the write time slots of the complete memory locations u12 and u13. Thereby, the time slots of the outgoing time channels lying within a respective pulse frame, for example, y2/y3, partially lie within the write cycle of the one complete memory U and partially within the write cycle of the other complete memory V.

As further proceeds from the drawing, the memory location addresses of the complete memories and the time slots of the time channels of the outgoing time-division multiplex line contain continuous numerical values in accordance with ; the successively succeeding write operation and read operations within each of the write cycles and each of the outgoing pulse frames. Of the time slots respectively lying within a transmission pulse frame, those which lie within the write cycle of the one complete memory at the same time, for example, U, represent a first part of the time slots of the outgoing time-division multiplex line. The time slots of the same transmission pulse frame which lie within the write cycle of the other complete memory, for example, V, represent a second part of the time slots of the time channels of the outgoing time-division multiplex line. Therefore, it is provided that a partial information to be read from one of the complete memories for a completed single-channel connection between an incoming time channel and an outgoing time channel is to be read from that respective complete memory located in the write mode when, in the case of the outgoing time channels of the first part (Y0'–Y3', for example, Y2'), the time value (for example, 14) corresponding to the complete memory location address (for example, u14) or, respectively, in the case of the outgoing time channels (Y4'–Y15') of the second part (for example, Y7') of the time value (for example, 2) corresponding to the complete memory location address (for example, v2), reduced by the multiple corresponding to the offset (12 in the present case), is equal to or smaller than the time value (2 or 7) corresponding to the time slot (for example, Y2' or, respectively Y7') of the appertaining, outgoing time channel. Otherwise, the appertaining partial information is to be read from the respective complete memory not located in the write mode, i.e. when the conditions cited above are not met.

In the exemplary connection for a multi-channel connection (four-channel connection) discussed above, the discussion was based on the fact that the outgoing time channels with the time slots Y8', Y10', Y4" and Y5" are assigned in terms of switching engineering to the incoming time channels with the time slots X0, X4, X11 and X14. Thereby, in continuous alternation, the memory locations u3 or, respectively, v3, u7 or, respectively, v7, u14 or, respectively, v14 and v1 or, respectively, u1, serve in this sequence for the intermediate storage of the partial information arriving in succession via the incoming time channels and in the sequence indicated above. In conjunction with the partial information arriving via the incoming time channels with the time slots X0, X4 and X15 and to be forwarded via the outgoing time channels with the time slots Y8', Y10' Y5", a "0", as is described above, is stored at the holding memory locations h1, h3 and h14 assigned to these outgoing time channels, being respectively stored in an appertaining memory location part (corresponding to the memory location portion h4m in the case of the memory location h4) as a respective auxiliary information which, upon reading each of these partial informations, causes that the reading respectively occurs from that complete memory of the two complete memories U or V which is not in the write mode at the time, which again proceeds from the presently given position of the transfer switch a or, respectively, from the device, for example, a relay, which controls the transfer switch or a corresponding switch structure which operates electronically). In contrast to this, a "1" is respectively stored as an auxiliary information in conjunction with the partial information arriving via the incoming time channel with the time slot X11 and to be forwarded via the outgoing time channel with the time slot Y4", being stored at the holding memory location h13 assigned to the outgoing time channel Y4", namely again at a memory location part belonging thereto, the auxiliary information effecting, upon reading of this partial information that the reading respectively occurs from that complete memory of the two full memories U or V which is in the write mode at the time.

It will now be assumed that the above exemplary connection is modified in such a manner that outgoing time channels with the time slots Y10', Y15', Y2" and Y5" are assigned in switching engineering terms to incoming time channels with the time slots X4, X13, X14 and X15. In this case, the memory locations u7 or, respectively, v7, v0 or, respectively, u0, v1 or, respectively, u1 and v2 or, respectively, u2, serve in continuous alternation for the intermediate storage of the partial information arriving in succession via these incoming time channels and in the sequence set forth above. In conjunction with the partial information arriving via the incoming time channels with the time slots X4 and X15 and to be forwarded via the outgoing time channels with the time slots Y10' and Y5", a "1", as explained above, is again respectively stored as an auxiliary information at the holding memory locations assigned to these outgoing time channels, again being respectively stored at the appertaining memory location part, the auxiliary information effecting, upon reading of the partial information, that the reading occurs from that complete memory of the two complete memories which is not in the write mode at the time. In conjunction with the partial information arriving via the incoming time channels with the time slots X13 and X14 and to be forwarded via the outgoing time channels with the time slots Y15' and Y2", a "1" is respectively stored as auxiliary information at the holding memory locations assigned to these outgoing time channels, i.e. at the respective memory location part, the auxiliary information effecting, upon reading of the partial information, that the reading respectively occurs from that complete memory U or V of the two complete memories which is in the write mode at the moment.

Therefore, it should be pointed out that, in the assignment of outgoing time channels to incoming time channels by means of a routing search and path selection, both outgoing time channels of the first partial frame of outgoing time channels are assigned to incoming time channels of the first partial frame of incoming time channels and outgoing time channels of the second partial frame are also assigned to incoming time channels of the second partial frame. In addition, however, outgoing time channels of the first partial frame can also be assigned in switching engineering terms to incoming time channels of the second partial frame, but outgoing time channels of the second partial frame can also be assigned to incoming time channels of the first partial frame in terms of switching engineering, i.e. by means of route searching and path selection. This additional assignment of outgoing time channels to incoming time channels, however, is alternative as a rule. This means that, as a rule, either outgoing time channels of the first partial frame are additionally assigned in terms of switching engineering to incoming time channels of the second partial frame or outgoing time channels of the second partial frame are assigned to incoming time channels of the first partial frame. As a rule, providing assignments of these two types in one connection would not be meaningful in conjunction with the viewpoints of the path selection.

Although I have described my invention by reference to specific illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a time-division multiplex telecommunication switching system, particularly a pulse code modulation telephone switching system, of the type having a time-division switching matrix by way of which, in comparison to a connection loading only a respective single time channel, connections loading two or more time channels can be produced for the purpose of attaining a greater bandwidth and/or a finer amplitude gradation, and in which for the switching of time channels of an incoming time-division multiplex line belonging to a multi-channel connection to corresponding time channels of an outgoing time-division multiplex line by way of a first memory for receiving partial information maximally transmittable in a pulse form, the original chronological sequence of the partial information incoming per pulse frame via the time channels is retained upon their transmission, and in which the write operation which serves for receiving the incoming partial information at memory locations of the first memory only per incoming time channel is cyclically executed and the read operation which serves for relaying the partial information only via the outgoing time channels is executed according to switching data which indicate the assignment of the outgoing time channels to the incoming time channels and are stored per outgoing time channel at memory locations of a holding memory in the form of memory location addresses of the first memory, the improvement therein comprising:

a second memory connectible to the incoming and outgoing multiplex lines;

means connected to said first and second memories and operable to condition one of said first and second memories to the write mode during a first write pulse frame and the other of said first and second memories to the write mode during a succeeding, second pulse frame;

means for providing a chronological offset in a lagging direction between the time channels of an incoming time-division multiplex line and the write pulse frames by a whole multiple of the duration of a time slot corresponding to a time channel so that, in accordance with the chronological offset, the partial information arriving within one pulse frame are partially stored in a second row of last memory locations of one of said first and second memories and are partially stored in a first row of first memory locations of the other of said first and second memories;

means for reading the partial information stored in the memory locations of said first and second memories within the next-successive pulse frame of the incoming time-division multiplex line for transmission via outgoing time channels; and linkage switch means for deriving from the first and second memory location addresses of the outgoing time channels in the holding memory location addresses corresponding thereto, in conjunction with the appertaining holding memory location address as to in which of the first and second memories the partial information stored under this memory location address is to be read.

2. The improved time-division multiplex telecommunication switching system of claim 1, and further comprising:

means for combining the outgoing time channels whose time slots lie within a respective, next-successive pulse frame of the incoming time channels into a first partial frame with respect to time slots and into a following, second partial frame with respect to time slots;

means providing an exchange-oriented assignment of outgoing time channels of the first or second partial frame, respectively, whose individual time slots correspond to the memory location addresses of the holding memory to incoming time channels of the first or second partial frame, respectively, whose individual time slots correspond to the memory location addresses of the first and second memories stored in the memory locations of the holding memory, a partial information to be transmitted on an outgoing time channel in its time slot can be respectively read with the assistance of the memory location address of the first or second memory stored in the holding memory from the first or second memory which is not in the write mode; and means providing an exchange-oriented assignment of outgoing time channels of the first or second partial frame, respectively, to incoming time channels of the second or first partial frame, respectively, so that a partial information to be transmitted on an outgoing time channel in its time slot can be respectively read from that memory of the first and second memories which is in the write mode at that time.

3. The improved time-division multiplex telecommunications switching system of claim 2, wherein the same respectively memory location address of the first or second memory serves for the selection of each of the memory locations of the first or second memories, and further comprising:
means in said linkage switch means for deriving an auxiliary information for the selection of a memory location in one of said first and second memories;
auxiliary information storage means in said holding memory for receiving and storing said auxiliary information; and means for determining from the auxiliary information the partial information to be forwarded to the holding memory memory location address is to be read from the first or second memory currently in the write mode or from the first or second memory not currently in the write mode.

4. The improved time-division multiplex telecommunication switching system of claim 3, and further comprising:
means for deriving the auxiliary information after reading of the appertaining first or second memory location address from the holding memory.

5. The improved time-division multiplex telecommunication switching system of claim 3, and further comprising:
means for deriving the auxiliary information not later than at the time of inscription of the appertaining memory location address of the first or second memory into the holding memory, said means operable in response to the location address of the holding memory and the location address of the appertaining first or second memory stored in the holding memory.

6. The improved time-division multiplex telecommunication switching system of claim 1, and further comprising:
for through-connection of single-channel connections, means for assigning outgoing time channels to incoming time channels as for multi-channel connections;
means for writing and reading memory location addresses in the same manner as in the through-connection of multi-channel connections; and
means for sequencing the partial information in the same manner as in the through-connection of multi-channel connections.

7. The improved time-division multiplex telecommunication switching system of claim 1, in which the time-division multiplex switching network is operable to handle single-channel and multi-channel connections, wherein:
said linkage switch means includes means for deriving for each of the time channels of the outgoing time-division multiplex line as to in which of the first and second memories the partial information stored under the respective memory location address is to be read, said means operable in response to the respective memory location address of the holding memory assigned to the appertaining time channel and the memory location address of the first or second memory to be stored or stored at the appertaining memory location in the holding memory.

8. The improved time-division multiplex telecommunication switching system of claim 7, wherein the memory location addresses of said first and second memories and the memory location addresses of the holding memory correspond to time values which reproduce the time slots of the incoming time channels and of the outgoing time channels, and further comprising:
means for reading the time values and causing reading from the memory in the write mode when the time value corresponding to the appertaining memory location address of that memory is smaller than the time value of the appertaining memory location address of the holding memory and from the memory which is not in the write mode when the time value corresponding to the memory location address is greater than the time value corresponding to the appertaining memory location address of the holding memory.

9. The time-division multiplex telecommunication switching system of claim 8, in which, in the time-division multiplex switching network the pulse frame boundaries of the pulse frames of the outgoing time channels are not chronologically coincident in comparison to the beginning and the end of the write cycles of the first and second memories and are delayed by a whole multiple of the duration of a time slot corresponding to a time channel, whereby the time slots of a first part or of a second part, respectively, of the outgoing time channels lying within a respective pulse frame and at the same time lie within the write cycle of one of the first and second memories, according to claim 8, and further comprising:
means for providing that the memory location addresses of the first and second memories and the time plots of the time channels of the outgoing time-division multiplex line represent continuous numerical values according to the successively succeeding write operations and read operations within each of the write cycles and each of the outgoing pulse frames; and
means providing that a partial information to be read from one of the first and second memories for a single-channel connection completed between an incoming time channel and an outgoing time channel is to be read from that first or second memory which is in the write mode when, in the time value corresponding to the memory location address or, respectively, the time value corresponding to the memory location address and increased by the plurality of full memory locations belonging to a write cycle, reduced by the multiple corresponding to the delay, is equal to or smaller than the time value corresponding to the appertaining outgoing time channels; and
means for providing that the partial information is to be read from the respective first or second memory not located in the write mode when these conditions are not met.

* * * * *